(12) United States Patent
Miller

(10) Patent No.: US 6,978,592 B1
(45) Date of Patent: Dec. 27, 2005

(54) RAKE WHEEL

(76) Inventor: Freddie Miller, 13220 240th St., Council Bluffs, IA (US) 51503

(*) Notice: Subject to any disclaimer, the term of this patent is extended or adjusted under 35 U.S.C. 154(b) by 25 days.

(21) Appl. No.: 10/675,681

(22) Filed: Sep. 30, 2003

(51) Int. Cl.[7] .............................................. A01D 80/02
(52) U.S. Cl. ........................................ 56/400; 56/375
(58) Field of Search ..................... 56/375, 376, 377, 56/378, 379, 384, 399, 400

(56) References Cited

U.S. PATENT DOCUMENTS

| | | | |
|---|---|---|---|
| 2,712,723 A | * | 7/1955 | Ryan ............................ 56/400 |
| 2,953,891 A | * | 9/1960 | Van Der Lely et al. ...... 56/377 |
| 3,057,145 A | | 10/1962 | Van Der Lely |
| 3,069,834 A | * | 12/1962 | Spindler ....................... 56/377 |
| 3,771,303 A | * | 11/1973 | Van der Lely et al. ....... 56/400 |
| 4,114,697 A | * | 9/1978 | Carlucci ...................... 172/543 |
| 4,947,631 A | * | 8/1990 | Kuehn .......................... 56/377 |
| 5,065,570 A | * | 11/1991 | Kuehn .......................... 56/377 |
| 5,546,739 A | * | 8/1996 | Hettich ......................... 56/367 |
| 6,715,275 B1 | * | 4/2004 | Kuehn .......................... 56/400 |

* cited by examiner

*Primary Examiner*—Thomas B. Will
*Assistant Examiner*—Nathan Mammen

(57) ABSTRACT

A rake wheel includes a hub and a plurality of tines connected to the hub and extending outwardly therefrom to an annular rim concentric with the hub. Each tine is journaled through a first plurality of apertures formed in the rim and projects outwardly from the rim. A second plurality of apertures is formed in the rim, having a size and shape substantially the same as the first plurality of apertures, and will receive the tines when the first set of apertures becomes worn or otherwise ineffective.

13 Claims, 1 Drawing Sheet

RAKE WHEEL

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1.) Field of the Invention

The present invention relates generally to farm implements for raking hay, cornstalks and other crops, and more particularly to an improved rake wheel that may be re-used rather than replaced after conventional wear and tear has occurred.

(2.) Background Information

Rakes used in the agricultural field have been known for many years. Their most common use is in the raking of hay or alfalfa into a row so that a baler will work more efficiently in the preparation of bales. Rakes are also commonly used for the turning of a row of hay or the like so that the crop will dry uniformly and thoroughly.

While rakes were initially used for crops such as hay, they have been put to more rigorous use by some farmers in cornfields and the like, for the raking of cornstalks into rows. Rakes may now be found in use for a wide variety of crops and situations.

One of the chief problems with prior art rakes is in the need for replacement of a wheel upon the breaking of a tine on the rake wheel. U.S. Pat. No. 3,057,145 addressed this problem by providing a rake wheel with dual tines fastened to a hub by a single bolt or other fastener. This assisted the farmer in easy replacement of the tines, without having to replace the entire wheel. However, the '145 patent did not address the problem of wear on the bearing aperture for each of the tines. Thus, after a period of use, the aperture in the rim securing each tine in position will gradually wear and become enlarged. This, in turn, causes the tine to fail to function properly, once the tine becomes to loose in the aperture. In such a case, it is necessary to replace the entire wheel, even if there is only one or a few loose tines.

Another problem with prior art rake wheels is the fact that they are less efficient if there is a crosswind. The wind tends to blow the hay through the tines of the wheel and into wheels on the opposite side of the rake. While some rake wheels are provided with an insert for shielding against the wind, the inserts are mounted between the hub and the wheel rim, and do not extend beyond the rim. Thus hay still blows between the tines outwardly of the rim. In addition, such shields typically cover the fastener bolts for the tines, thereby requiring removal of the shield before it is possible to replace or repair a tine.

BRIEF SUMMARY OF THE INVENTION

It is therefore a general object of the present invention to provide an improved wheel for a raking implement.

A further object of the present invention is to provide a rake wheel with a rim and tines that may be shifted, to extend the functional life of the wheel.

Another object is to provide an improved rake wheel with a windshield that reduces the amount of crops that blow through the wheel, as compared to prior art shields.

Yet a further object of the present invention is to provide an improved rake wheel with a windshield that permits removal and replacement of the tines without removing the shield.

These and other objects will be apparent to those skilled in the art.

The rake wheel of the present invention includes a hub and a plurality of tines connected to the hub and extending outwardly therefrom to an annular rim concentric with the hub. Each tine is journaled through a first plurality of apertures formed in the rim and projects outwardly from the rim. A second plurality of apertures is formed in the rim, having a size and shape substantially the same as the first plurality of apertures, and will receive the tines when the first set of apertures becomes worn or otherwise ineffective.

BRIEF DESCRIPTION OF THE DRAWING

The preferred embodiment of the invention is illustrated in the accompanying drawings, in which.

DETAILED DESCRIPTION OF THE INVENTION

Figure 1:
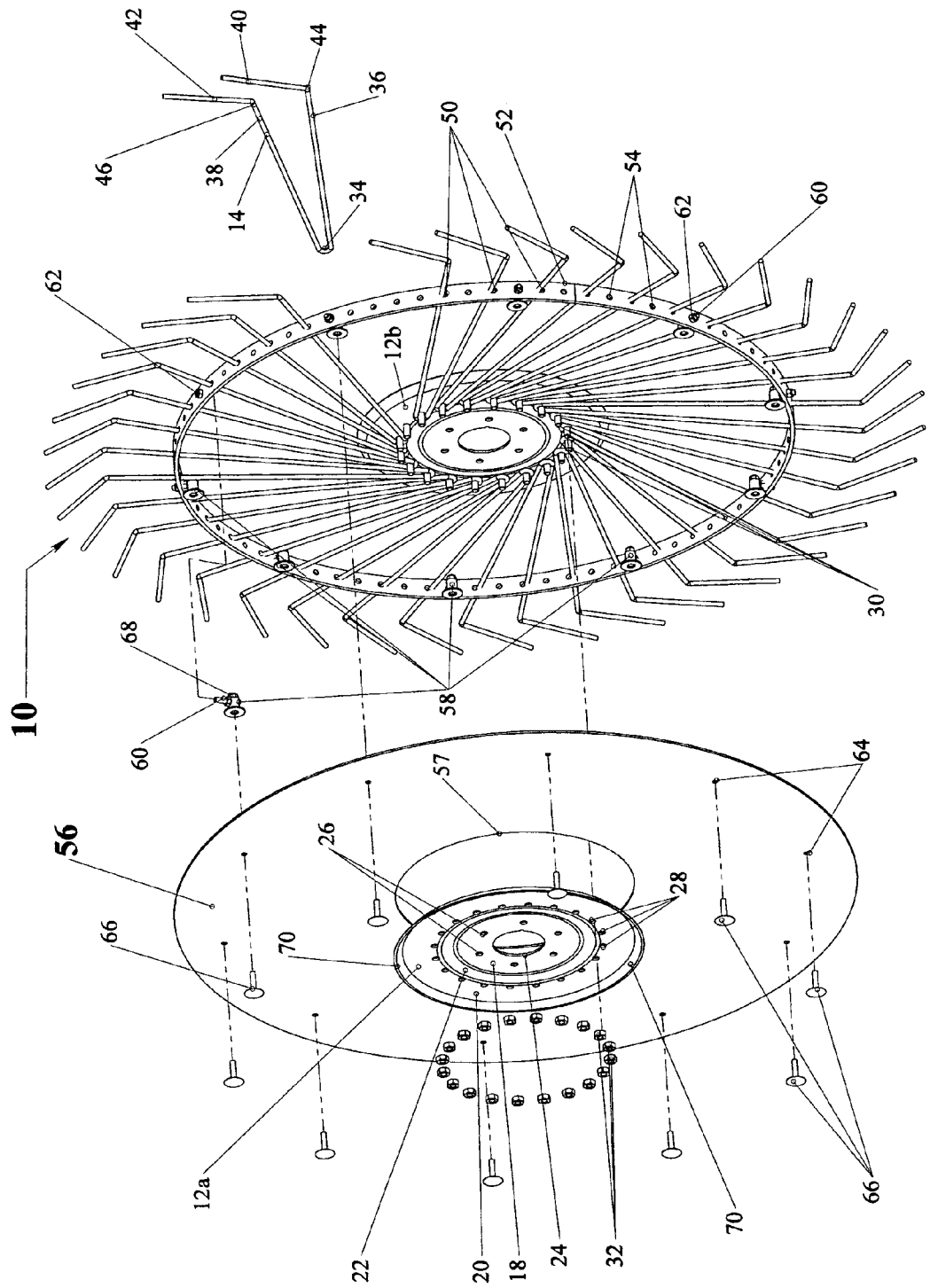
FIG. 1 is an exploded perspective view of the rake wheel of the present invention.

Referring now to the drawing, the rake wheel of the present invention is designated generally at 10 and includes a pair of identical and opposing flanges 12a and 12b from which a plurality of tines 14 extend. Tines 14 extend through a ring-shaped rim 16 for securement in the desired position for raking materials on the ground.

Because flanges 12a and 12b are identical, only flange 12a will be described in detail herein. Flange 12a is a disk-shaped member having a flat inner ring 18 and a flat outer ring 20. Outer ring 20 is parallel to and spaced radially and orthogonally outwardly from inner ring 18, and is connected to the inner ring by a sloped annular portion 22. Inner ring 18 has a central opening 24, which receives a shaft on an implement (not shown) so that the wheel 10 may be rotatably mounted on the implement in a conventional fashion.

Inner ring 18 extends radially outwardly from central opening 24, and has a plurality of apertures 26 formed therein, spaced uniformly around the opening 24. Apertures 26 will receive bolts (not shown) therethrough to secure flange 12a to flange 12b, thereby forming a central hub, designated generally at 12.

Connecting portion 22 extends radially outwardly from the peripheral edge of inner ring 18 and also project outwardly from the plane of inner ring 18. Outer ring 20 extends radially outwardly from connecting portion 22, and has a plurality of apertures 28 formed therein and spaced uniformly around the ring 22. Each aperture 28 will receive a tine securement bolt 30 (shown projecting from flange 12b in the drawing), which are secured in place by nuts 32. Because outer rings 22 of flanges 12a and 12b are parallel and spaced apart from one another, an annular space is formed between the outer rings, through which tines 14 extend.

Each tine 14 is preferably formed from extra high strength steel and has a diameter of about 0.283 inches. Each tine 14 is bent in half to form an elbow 34 with two projecting legs 36 and 38. The distal ends 40 and 42 of legs 36 and 38, respectively, are bent at an angle at bends 44 and 46, respectively. A plurality of tines 14 have their elbows 34 secured to hub 12, with their legs 36 and 38 projecting outwardly and journaled through apertures 50 in a ring-shaped rim 52.

Rim 52 is preferably formed of ¼ inch thick by 1¼ inch wide flat metal strap welded into an annular shape with the width oriented orthogonal to the plane formed by tines 14 on hub 12. For a 54 inch overall wheel diameter, the rim has a diameter of 38 inches and twenty tines 14, with 40 projecting legs 36 and 38, are attached. In this preferred embodiment, forty apertures 50 are provided along a centerline of the rim width, and are uniformly spaced around rim 52. Apertures 50 will snugly receive each of tine legs 36 and 38 therethrough.

As shown in the drawing, rim 52 is provided with a second set of forty apertures 54, identical in size and shape as apertures 50. The second set of apertures 54 are uniformly spaced around rim 52, with each aperture 54 located centrally between a pair of the first set of apertures 50. Second set of apertures 54 serve a two-fold purpose. First, they serve to receive tine legs 36 and 38, once the first set of apertures 50 become worn and/or rusted. Thus, tines 14 may be shifted on wheel 10 two the second set of apertures 54, rather than having to completely discard wheel 10.

The second purpose for apertures 54 is for the selective securement of a windshield 56 to wheel 10. Wind shield 56 is preferably a ⅛ inch thick plastic disk with a central opening 57 having a diameter slightly less than the outer diameter of hub flanges 12a and 12b. The outer diameter of windshield 56 is greater than the diameter of rim 52, to extend past the rim towards the bends 44 and 46 in tine legs 36 and 38. A plurality of collars 58 having a length approximately equal to the width of rim 52 are secured to rim 52 by a threaded bolt 60 projecting orthogonally from each collar 58. Bolts 60 project through selected apertures 54 around the rim 52 and are secured in position by nuts 62 in a conventional fashion.

Windshield 56 has a plurality of apertures 64 formed therethrough and positioned uniformly around a circle having a diameter equal to the distance of the collars 58 from the center of the hub 12. A series of bolts 66 extend through the wind shield apertures 64 and thence through the collars 58 and are secured in position by a plurality of locknuts 68. A lip 70 is preferably formed on the peripheral edge of each flange outer ring 20, which will retain the inner diameter of windshield 56 in position.

Because the windshield 56 extends beyond the diameter of rim 52, it can be seen that it is effective to block the passage of wind through tines 14 of wheel 10. In addition, the wind shield 56 may be attached to either side of wheel 10, thereby eliminating the need to purchase either "right" or "left" version of the shield or wheel. Because the inventor has provided a hub 12 with two flanges 12a and 12b, and a wind shield 56 that does not extend over the securement bolts 30 for the hub flanges 12a and 12b, the tines 14 may be repaired or replaced from either side of wheel 10, and may be accessed without requiring the removal of the windshield 56.

Whereas the invention has been shown and described in connection with the preferred embodiments thereof, many modifications, substitutions and additions may be made which are within the intended broad scope of the appended claims.

What is claimed is:

1. A rake wheel, comprising:
   a hub having a rotational axis;
   a plurality of tines connected to said hub and having at least one leg extending outwardly therefrom in a plane perpendicular to the hub rotational axis;
   an annular rim concentric with the hub and having a first plurality of apertures formed therein and spaced uniformly around the circumference of the rim;
   said first plurality of apertures equal in number to the number of tine legs extending from the plurality of tines;
   each of said first plurality of apertures having a size and shape to snugly, slidably receive a tine leg therethrough; and
   a second plurality of apertures formed in the rim equal in number to the first plurality of apertures, each of the second plurality of apertures having a size and shape substantially the same as each of the first plurality of apertures, and spaced uniformly around the circumference of the rim;
   said tine legs projecting through either said first plurality of apertures or said second plurality of apertures and projecting outwardly to a free end beyond the rim.

2. The rake wheel of claim 1, wherein said hub includes a pair of parallel disk-shaped flanges connected together, and wherein said tines are connected to said hub generally centrally between said flanges.

3. The rake wheel of claim 2, wherein each of said second plurality of apertures is positioned generally centrally between a pair of said first plurality of apertures.

4. The rake wheel of claim 3, wherein each of said tines is bent in half at an elbow with the elbow secured to said hub, and with first and second legs projecting outwardly from the elbow, each said leg journaled through one of said apertures.

5. The rake wheel of claim 2, further comprising:
   a generally planar, disk-shaped windshield removably connected to said wheel;
   said shield extending radially outwardly from a central opening to an outer diameter beyond the rim of the wheel, said central opening forming an inner diameter of the shield;
   said shield inner diameter being less than an outer diameter of the hub, such that the shield covers the tines from the hub to a point beyond the rim.

6. The rake wheel of claim 1, wherein each of said tines is bent in half at an elbow with the elbow secured to said hub, and with first and second legs projecting outwardly from the elbow, each said leg journaled through one of said first plurality of apertures.

7. The rake wheel of claim 1, further comprising:
   a generally planar, disk-shaped windshield removably connected to said wheel;
   said shield extending radially outwardly from a central opening to an outer diameter beyond the rim of the wheel, said central opening forming an inner diameter of the shield;
   said shield inner diameter being less than an outer diameter of the hub, such that the shield covers the tines from the hub to a point beyond the rim.

8. A rake wheel, comprising:
a hub having a rotational axis;
a plurality of tines connected to said hub and extending outwardly therefrom in a plane perpendicular to the hub rotational axis;
an annular rim concentric with the hub and having a first plurality of apertures formed therein and spaced uniformly around the circumference of the rim, each said tine having at least one leg projecting through one of said first plurality of apertures and projecting outwardly to a free end beyond the rim;
each of said first plurality of apertures having a size and shape to snugly, slidably receive a tine therethrough; and
a second plurality of apertures formed in the rim, each of the second plurality of apertures having a size and shape substantially the same as each of the first plurality of apertures, and spaced uniformly around the circumference of the rim;
said hub including a pair of parallel disk-shaped flanges connected together;
said tines being connected to said hub generally centrally between said flanges;
each of said second plurality of apertures being positioned generally centrally between a pair of said first plurality of apertures;
each of said tines being bent in half at an elbow with the elbow secured to said hub, and with first and second legs projecting outwardly from the elbow, each said leg journaled through one of said first plurality of apertures; and
wherein each of said hub flanges have an inner ring and an outer ring, the inner rings of the flanges abutting one another and secured together, the outer rings of the flanges spaced apart from one another and parallel to one another to form an annular slot therebetween, and wherein each of the tines is secured to the hub within the annular slot between the outer rings.

9. The rake wheel of claim 8, wherein said hub includes a plurality of removable bolts extending between the outer rings and through the annular slot, and wherein each tine elbow is connected to each said bolt.

10. A rake wheel, comprising:
a hub having a rotational axis;
a plurality of tines connected to said hub and extending outwardly therefrom in a plane perpendicular to the hub rotational axis;
an annular rim concentric with the hub and having a first plurality of apertures formed therein and spaced uniformly around the circumference of the rim, each said tine having at least one leg projecting through one of said first plurality of apertures and projecting outwardly to a free end beyond the rim;
each of said first plurality of apertures having a size and shape to snugly, slidably receive a tine therethrough;
a second plurality of apertures formed in the rim, each of the second plurality of apertures having a size and shape substantially the same as each of the first plurality of apertures, and spaced uniformly around the circumference of the rim;
said hub including a pair of parallel disk-shaped flanges connected together, and wherein said tines are connected to said hub generally centrally between said flanges; and
each of said hub flanges having an inner ring and an outer ring, the inner rings of the flanges abutting one another and secured together, the outer rings of the flanges spaced apart from one another and parallel to one another to form an annular slot therebetween, and wherein each of the tines is secured to the hub within the annular slot between the outer rings.

11. A rake wheel, comprising:
a hub having a rotational axis;
a plurality of tines connected to said hub and extending outwardly therefrom in a plane perpendicular to the hub rotational axis;
an annular rim concentric with the hub and having a first plurality of apertures formed therein and spaced uniformly around the circumference of the rim, each said tine having at least one leg projecting through one of said first plurality of apertures and projecting outwardly to a free end beyond the rim;
each of said first plurality of apertures having a size and shape to snugly, slidably receive a tine therethrough;
a second plurality of apertures formed in the rim, each of the second plurality of apertures having a size and shape substantially the same as each of the first plurality of apertures, and spaced uniformly around the circumference of the rim;
a generally planar, disk-shaped windshield removably connected to said wheel;
said shield extending radially outwardly from a central opening to an outer diameter beyond the rim of the wheel, said central opening forming an inner diameter of the shield;
said shield inner diameter being less than an outer diameter of the hub, such that the shield covers the tines from the hub to a point beyond the rim; and
said rim including a plurality of collars removably connected to a plurality of said second plurality of rim apertures, each collar oriented orthogonal to the wind shield, and further comprising a plurality of removable fasteners extending through said collars and through a plurality of apertures formed in the wind shield associated with each collar to removably secure said shield to said collars and rim.

12. A rake wheel, comprising:
a hub having a rotational axis;
a plurality of tines connected to said hub and extending outwardly therefrom in a plane perpendicular to the hub rotational axis;
an annular rim concentric with the hub and having a first plurality of apertures formed therein and spaced uniformly around the circumference of the rim, each said tine having at least one leg projecting through one of said first plurality of apertures and projecting outwardly to a free end beyond the rim;
each of said first plurality of apertures having a size and shape to snugly, slidably receive a tine therethrough;
a second plurality of apertures formed in the rim, each of the second plurality of apertures having a size and shape substantially the same as each of the first plurality of apertures, and spaced uniformly around the circumference of the rim;
said hub including a pair of parallel disk-shaped flanges connected together;
said tines being connected to said hub generally centrally between said flanges;
a generally planar, disk-shaped windshield removably connected to said wheel;
said shield extending radially outwardly from a central opening to an outer diameter beyond the rim of the wheel, said central opening forming an inner diameter of the shield;

said shield inner diameter being less than an outer diameter of the hub, such that the shield covers the tines from the hub to a point beyond the rim; and said rim including a plurality of collars removably connected to a plurality of said second plurality of rim apertures, each collar oriented orthogonal to the wind shield, and further comprising a plurality of removable fasteners extending through said collars and through a plurality of apertures formed in the wind shield associated with each collar to removably secure said shield to said collars and rim.

13. The rake wheel of claim 12, wherein:

said hub flanges include a radially projecting lip having an outer diameter;

the inner diameter of the wind shield is less than the outer diameter of the lip and greater than a diameter of a circle circumscribed by the bolts securing the tines;

whereby the tine bolts and the tines may be removed and replaced without removing the windshield.

* * * * *